United States Patent [19]

Lewis et al.

[11] Patent Number: 5,280,063
[45] Date of Patent: Jan. 18, 1994

[54] ROOM TEMPERATURE SETTING CARBONACEOUS CEMENT

[75] Inventors: Irwin C. Lewis, Strongsville; Terrence Pirro, Cleveland; Ronald A. Greinke, Medina; Richard I. Bretz; Dennis J. Kampe, both of Parma, all of Ohio

[73] Assignee: Ucar Carbon Technology Corporation, Danbury, Conn.

[21] Appl. No.: 870,314

[22] Filed: Apr. 17, 1992

[51] Int. Cl.⁵ .................. C08K 3/04; C08L 61/10
[52] U.S. Cl. ...................... 524/594; 524/495; 524/496; 524/593; 524/541; 524/847; 525/485
[58] Field of Search ............. 524/495, 496, 594, 847, 524/593, 540, 541, 542; 525/485

[56] References Cited

U.S. PATENT DOCUMENTS

| 3,441,529 | 4/1969 | Tyler et al. | 260/19 |
| 4,915,874 | 4/1990 | Nadkarni et al. | 524/495 |
| 5,002,981 | 3/1991 | Chiu | 523/141 |

FOREIGN PATENT DOCUMENTS

| 0098378 | 7/1983 | Japan | 524/496 |
| 0272666 | 10/1989 | Japan | 524/496 |

*Primary Examiner*—Paul R. Michl
*Assistant Examiner*—Peter Szekely
*Attorney, Agent, or Firm*—F. J. McCarthy

[57] ABSTRACT

A room temperature setting carbonaceous cement comprising a solid carbonaceous material, a catalyst and a liquid carbonizable component which when treated with the catalyst will provide a carbon yield of at least 40% at an elevated baking temperature and possess a flexural strength which is above at least 750 psi at room temperature and at said elevated temperature.

18 Claims, No Drawings

ROOM TEMPERATURE SETTING CARBONACEOUS CEMENT

FIELD OF THE INVENTION

This invention relates to a room temperature setting carbonaceous cement.

BACKGROUND OF THE INVENTION

A carbonaceous cement is composed of an admixture of a carbonaceous material and a thermosetting resin and is conventionally used to bond carbon and graphite structures at elevated temperature. Typically the cement will not set below about 100° C. and will cure and develop a full bond strength at a higher temperature. A carbonaceous cement is currently available from the UCAR Carbon Company, designated as C34 with a composition which is fully described in U.S. Pat. No. 3,441,529. This cement requires heat treatment to 150°-200° C. to achieve setting and full curing and to develop a useful flexural strength of about 2000 psi. The strength is retained on subsequent baking to 850° C. The heat treatment requirement for the C-34 cement presents a substantial practical limitation for use at construction sites where appropriate equipment to heat cemented structures is generally not available. A room temperature setting cement, produced by Sigri Co. and described in Light Metals p. 759 (1991) is also commercially available and currently used by the aluminum industry for cementing collector bars onto cathodes in the production of aluminum. However this cement, which is a three component system, achieves a strength of only about 304 psi after curing and loses most of its strength after baking to 900° C. This cement contains an epoxy resin as the thermosetting liquid, a separate catalyst and a carbon solid. Epoxy resins are known to have limited thermal stability and to give very low carbon yields on baking. It is for this reason that the Sigri cement retains very little strength at high baking temperatures. For more general application it is very desirable to have a cement which can set at room temperature and provide adequate strength to permit physical handling without suffering loss in strength after curing and baking. For this purpose it is desirable for the cement to contain a thermosetting resin which can provide a high carbon yield after curing and baking. The minimum strength deemed necessary to satisfy this requirement is an average strength of at least about 750 psi and preferably above 1000 psi. The three component carbonaceous cement which is presently available from Sigri Co. will set at room temperature but does not provide the minimum strength required at room temperature for more general applications or the ability to retain the minimum strength after curing and baking. A three component system also has practical disadvantages to the user over a two component system in that the proper blending of three components is cumbersome and substantially increases the time of application relative to a two component system.

SUMMARY OF THE INVENTION

A carbonaceous two component thermosetting cement system has been developed in accordance with the present invention which will set at room temperature to provide a rigid cement with an average strength of at least about 750 psi. The setting reaction at room temperature is sufficiently slow that the cement can be applied practically and safely within one to two hours and then develop high strength by further setting at room temperature for up to twenty four hours or longer. This cement increases substantially in strength after full curing at 150° C. and retains a high strength after baking to 850° C.

The carbonaceous cement of the present invention broadly comprises a solid component of a carbonaceous material, a catalyst and a liquid carbonizable component. The solid component preferably comprises an admixture of carbonaceous particles, a phenolic resin and a strong acid catalyst selected from the group consisting of p-toluene sulfonic acid, benzene sulfonic acid, tri-chloroacetic acid, naphthalene disulfonic acid, benzene disulfonic acid, trifluroacetic acid, sulfuric acid and methanesulfonic acid. The liquid component is preferably composed of a liquid phenolic dissolved in furfuraldehyde.

The liquid component of the present cement when combined with the catalyst of the solid component provides a very high carbon yield of at least 40-50% on baking, resulting in a retention of strength at high temperature.

Other advantages of the invention will become apparent from the following detailed description of the invention.

DETAILED DESCRIPTION OF A PREFERRED EMBODIMENT OF THE INVENTION

The carbonaceous cement of the present invention is preferably provided as a two component system although it may be made available as a three component system. The two component system includes a solid portion and a liquid portion with the solid portion preferably comprising a mixture of a solid phenolic resin, a suitable carbonaceous material selected from the group consisting of graphite flour, petroleum coke flour, carbon black, pitch coke flour, calcined lampblack flour and the like and a solid acid catalyst. The solid acid catalyst should be selected from the group consisting of p-toluene sulfonic acid, benzene sulfonic acid, trichloroacetic acid, naphthalene disulfonic acid, benzene disulfonic acid, trifluroacetic acid, sulfuric acid and methanesulfonic acid. The solid phenolic resin can be omitted from the solid component but the strength will be reduced.

The liquid portion comprises a solution of a phenolic resin in furfuraldehyde. Any conventional phenolic resin preferably of the resol type can be employed in the solid and/or liquid portion of the carbonaceous cement of the instant invention. However, the phenolic resin should not have any amine or basic catalyst component since this will neutralize the acid catalyst of the resin. The acid catalyst catalyzes the polymerization and carbonization of the furfuraldehyde liquid. The liquid containing the dissolved Phenolic resin will give a bake carbon yield of at least 40% when treated with the catalyst of the solid component. The phenolic resin can be removed from the liquid portion and still permit room temperature setting by catalysis of furfural. However the liquid carbon Yield will be reduced by about one half and the cured and bake strength will also be reduced.

In the two component system the solid component is preferably composed of carbonaceous particles of graphite powder, carbon black, a solid acid catalyst and a solid phenolic resin. Preferred carbon blacks are gas blacks, which are made by the passage of natural gas over hot refractories. A suitable carbon black is available under the trademark "Thermax" from Cancurb Co., Alberta, Canada. Although preferred, the carbon black component may be omitted from the composition of the solid component. The solid component may also be composed of graphite and Thermax with the phenolic component omitted but the cement strength will be diminished.

The cement may also be formulated as a three component system consisting of a solid and liquid component as above described for the two component system with an acid catalyst provided as a separate third component in the form of a fluid solution in water or alcohol.

Suitable amounts of the carbonaceous particles in the total cement of the invention are from about 40 wt % to about 75 wt %, preferably from about 55 wt % to about 65 wt %. When the carbonaceous particles in the solid component are composed of graphite powder and Thermax carbon black, the graphite powder is present in an amount of about 30 wt % to about 50 wt % and the Thermax carbon black is present in an amount of from about 10 wt % to about 30 wt % based upon the weight of the cement. The minimum concentration of catalyst to achieve a room temperature setting will depend upon the selection of the catalyst. When p-toluene sulfonic acid is used as the acid catalyst a room temperature setting can be achieved in less than twenty four hours with as little as about 2.0 weight percent acid catalyst based upon the weight of the cement.

If increased electrical conductivity is required for the cement, as in certain applications for aluminum cells, iron or steel powder can be added to the solid portion of the cement. Suitable amounts of iron or steel particles in the total cement of the current invention are from 10% to 40% by weight, preferably from 20% to 30% by weight. A larger amount of p-toluenesulfonic acid is required for room temperature setting when iron or steel particles are present. When the catalyst is p-toluenesulfonic acid, then the weight of catalyst required is about twice that used for a cement prepared without the addition of iron.

The following examples illustrate a two and three component cement in accordance with the present invention:

EXAMPLE 1—THREE COMPONENT CEMENT

A three component cement consisting of a solid, liquid, and a catalyst was prepared using the following compositions:

| Solid: | Graphite Flour | 70 g |
| --- | --- | --- |
| | Thermax | 30 g |
| | Phenolic Resin | 20 g |
| Liquid: | 50/50 by volume Resol Phenolic/ Furfuraldehyde | 40 g |
| Catalyst: | 75/25 by Weight p-Toluene Sulfonic acid in Water | 5 g |

The graphite flour is milled graphite which at least 60% passes through a 200-mesh screen.

The three components were thoroughly mixed and then used to cement two pieces of isotropic ATJ graphite. The cemented graphite pieces were tested after sitting at room temperature for six days and the cement bond strength was measured as 1260 psi.

A second set of cemented pieces was cured to fully cross-link the cement bond by heating at 140° C. for one hour. The cured cemented pieces were then tested for bond strength and the graphite specimens broke at a strength value of 3000 psi while the joint was still intact. The joint strength therefore exceeded 3000 psi.

A third set of cemented samples was also cured at 140° C., baked to 850° C., and then tested for strength. The strength value after baking was measured at 1780 psi.

EXAMPLE 2—TWO COMPONENT CEMENT

A two component cement was prepared with only a solid and a liquid component. The cement had the following compositions:

| Solid: | Graphite Flour | 70 g |
| --- | --- | --- |
| | Thermax | 30 g |
| | Phenolic Resin | 20 g |
| | p-Toluene Sulfonic Acid Monohydrate | 3.75 g |
| Liquid: | 50 Volume % Resol Phenolic Resin in Furfuraldehyde | 40 g |

The cementing and testing was carried out identically to Example 1. The strength after room temperature setting for about 6 days was 1180 psi. The bonded piece after curing developed a strength greater than 3000 psi since the graphite rather than the cemented bond broke after testing. Cemented pieces tested after being baked to 850° C. gave strength values of 1620 psi.

The solid components with PTSA catalyst were stored for three months at room temperature without altering the bonding properties of the cement.

EXAMPLE 3—TWO COMPONENT CEMENT

The cement of Example 2 was tested after setting at room temperature for 24 hours. The cement had completely solidified showing it had set and the flexural strength was measured as 620 psi. After curing at 140° C. for one hour the flexural strength exceeded 3000 psi. A sample that was baked to 850° C. had a strength of 1600 psi.

EXAMPLE 4—INCREASE OF LIQUID CONTENT

The cement of Example 2 was prepared using twice the amount of liquid to provide a cement with a lower viscosity. The composition of this cement was:

| | | Weight | Wt % |
| --- | --- | --- | --- |
| (Solids | Graphite Flour | 70.0 g | 34.35 |
| and | Thermax | 30.0 g | 14.73 |
| Catalyst) | Phenolic Resin | 20.0 g | 9.82 |
| | p-Toluene Sulfonic Acid Monohydrate | 3.75 g | 1.84 |
| Liquid: | 50% by Volume Resol phenolic in Furfuraldehyde | 80.0 g | 39.26 |

After 24 hours at room temperature, this cement was fully set showing that the catalyst level was sufficient.

EXAMPLE 5—DECREASE OF CATALYST CONTENT

The cement of Example 4 was repeated except that the p-toluene sulfonic acid catalyst level was reduced by 50% to 1.875 grams. After 96 hours at room temperature, the cement was still fluid indicating it had not fully set.

|  |  | Weight | Wt. % |
|---|---|---|---|
| (Solids | Graphite Flour | 70.0 g | 34.67 |
| and | Thermax | 30.0 g | 14.86 |
| Catalyst) | Phenolic Resin | 20.0 g | 9.91 |
|  | P-toluene Sulfonic Acid Monohydrate | 1.875 g | 0.93 |
| Liquid: | (50/50 Resol Phenolic by Volume in Furfuraldehyde) | 80.0 g | 39.63 |

EXAMPLE 6—HIGH CONDUCTIVITY CARBONACEOUS CEMENT

In order to increase the electrical conductivity, a cement similar to that in Example 2 was prepared except that steel filings were added to increase the electrical conductivity. The cement had the following composition:

|  |  | Weight |
|---|---|---|
| Solids: | Graphite Flour | 70.0 g |
|  | Thermax | 30.0 g |
|  | Phenolic Resin | 20.0 g |
|  | p-Toluene Sulfonic Acid Monohydrate | 11.25 g |
|  | Steel Filings | 80.0 g |
| Liquid: | 50% Resol phenolic by Volume in Furfuraldehyde | 50.0 g |

This cement was set after sitting at room temperature for 24 hours. A higher catalyst level had to be used to obtain room temperature setting with the added steel filings.

EXAMPLE 7—REMOVAL OF PHENOLIC FROM LIQUID COMPONENT (a) A cement was prepared similar to Example 1, except that the liquid component contained furfuraldehyde without any added phenolic resin. A small amount of Polyox, a trademark product of Union Carbide Corporation for a water soluble polyethyleneoxide resin, was added as a thickener. The cement had the following composition:

| Solids: | Graphite Flour | 17.5 gms |
|---|---|---|
|  | Thermax | 7.5 gms |
|  | Phenolic Resin | 5.0 gms |
| Liquid: | Furfuraldehyde | 9.9 gms |
|  | Polyox | 0.2 gms |
| Catalyst: | 75% p-toluene Sulfonic acid in water | 2.5 gms |

This material appeared to set to a solid at room temperature after about 24 hours. The cement was completely cured by heating to 200° C. in argon for two hours. The cure yield was 89.8%. The cement was then baked by heating to 800° C. in an inert atmosphere and held at 800° C. for one hour. The bake carbon yield was 86.5% giving an overall yield of 77.7% (89.8×0.865).

(b) For comparison a cement similar to Example 1 was prepared with the following composition:

| Solid: | Graphite Flour | 17.5 gms |
|---|---|---|
|  | Thermax | 7.5 gms |
|  | Phenolic resin | 5.0 gms |
| Liquid: | Furfuraldehyde | 5.0 gms |
|  | Phenolic resin | 5.0 gms |
| Catalyst: | 75% P-toluene Sulfonic acid in water | 1.3 gms |

This cement gave a cure yield of 98.0%, a bake yield of 82.8% and an overall yield of 81.1%. The lower carbon yield of the example of (7a) would be expected to lead to reduced strength.

EXAMPLE 8—REMOVAL OF PHENOLIC RESIN FROM THE SOLID PORTION

A cement similar to Example 1 was prepared except that there was no phenolic resin in the solids. The composition follows:

| Solids: | Graphite Flour | 20.0 gms |
|---|---|---|
|  | Thermax | 9.0 gms |
| Liquid: | 2-Furfuraldehyde | 5.0 gms |
|  | Phenolic (resol) | 5.0 gms |
| Catalyst: | 75% p-toluene Sulfonic acid in water | 1.26 gms |

After sitting at room temperature for 24 hours, the cement had solidified.

The cement was fully cured by holding at 200° C. in an argon atmosphere for two hours and gave a cure yield of 90.7%. However, the cured cements were porous and had a poorer structure than the baked cements of Examples 1 and 2.

What is claimed is:

1. A two component room temperature setting carbonaceous cement consisting of a separate solid component and a separate liquid component with said solid component comprising an admixture of carbonaceous particles pre-mixed with a solid phenolic resin, and a strong acid catalyst selected from the group consisting of p-toluene sulfonic acid, benzene sulfonic acid, trichloroacetic acid, naphthalene disulfonic acid, benzene disulfonic acid, trifluroacetic acid, sulfuric acid and methanesulfonic acid with said liquid component comprising an amine-free solution of liquid phenolic resin dissolved in furfuraldehyde.

2. A two component carbonaceous cement as defined in claim 1 wherein said carbonaceous particles comprises particles of graphite powder and carbon black.

3. A two component carbonaceous cement as defined in claim 2 wherein said liquid phenolic resin is a phenolic resol.

4. A two component carbonaceous cement as defined in claim 3 wherein said carbonaceous particles are present in said cement in an amount of between 40 to 75 percent by weight.

5. A two component carbonaceous cement as defined in claim 3 wherein said carbonaceous particles comprise particles of graphite powder in an amount of about 30 wt % to about 50 wt % and carbon black in an amount of from about 10 wt % to about 30 wt % based upon the weight of the cement.

6. A three component carbonaceous cement consisting of a first solid component, a second liquid component and a third component containing a catalyst with said first solid component comprising an admixture of carbonaceous particles and a phenolic resin, said second liquid component being amine-free and comprising a solution of liquid resol phenolic dissolved in furfuraldehyde and wherein said catalyst consists of a strong acid selected form the group consisting of p-toluene sulfonic acid, benzene sulfonic acid, trichloroacetic acid, naphthalene disulfonic acid, benzene disulfonic acid, trifluoroacetic acid, sulfuric acid and methanesulfonic acid dissolved in water or alcohol.

7. A room temperature setting carbonaceous cement in accordance with claim 6 comprising an admixture of a carbonaceous material, a catalyst and a carbonizable liquid for providing said cement with a carbon yield of at least 40% at an elevated baking temperature to and about 800° C. a flexural strength of about at least 750 psi at room temperature and at said elevated baking temperature.

8. A room temperature setting cement as claimed in claim 7 wherein said carbonaceous material and catalyst are solid components with said carbonaceous material selected from the group consisting of graphite flour, petroleum coke flour, carbon black, pitch coke flour and calcined lampblack flour.

9. A room temperature setting cement as claimed in claim 8 wherein said catalyst is a solid acid catalyst selected from the group consisting of p-toluene sulfonic acid, benzene sulfonic acid, trichloroacetic acid, naphthalene disulfonic acid, benzene disulfonic acid, trifluoroacetic acid, sulfuric acid and methanesulfonic acid.

10. A room temperature setting cement as claimed in claim 9 wherein said carbonizable liquid comprises furfuraldehyde.

11. A room temperature setting cement as claimed in claim 10 wherein said carbonizable liquid further comprises a phenolic resol resin dissolved in said furfuraldehyde.

12. A room temperature setting cement as claimed in claim 11 wherein said admixture further comprises a solid phenolic resin.

13. A room temperature setting cement as defined in claim 12 wherein the concentration of said carbonaceous particles are from 40 wt % to about 75 wt % based on the weight of the cement.

14. A room temperature setting cement as defined in claim 13 wherein said carbonaceous particles are composed of graphite powder and Thermax carbon black.

15. A room temperature setting cement as defined in claim 14 wherein the graphite powder is present in an amount of from 30 wt % to about 50 wt % and the carbon black is present in an amount of from about 10 wt % to about 30 wt % based on the weight of the cement.

16. A room temperature setting cement as defined in claim 15 wherein said catalyst comprises p-toluene sulfonic acid and with the strength of the cement after cure exceeding 3000 psi and having a bake strength value above 1500 psi.

17. A room temperature cement as defined in claim 7 further comprising the addition of steel or iron powder to insure the electrical conductivity of said cement.

18. A room temperature cement and defined in claim 17 wherein the concentration of said steel or iron powder is from 10% to 40% based on the weight of the cement.

* * * * *